United States Patent
Derbez et al.

(10) Patent No.: US 9,134,425 B2
(45) Date of Patent: Sep. 15, 2015

(54) SYSTEM AND METHOD FOR MANAGING EPHEMERIS REQUESTS FROM CLIENT DEVICES

(75) Inventors: Eric Derbez, Vancouver (CA); Ashkan Izadpanah, Vancouver (CA)

(73) Assignee: RX NETWORKS INC., Vancouver (CA)

( * ) Notice: Subject to any disclaimer, the term of this patent is extended or adjusted under 35 U.S.C. 154(b) by 718 days.

(21) Appl. No.: 13/387,647

(22) PCT Filed: Aug. 4, 2010
(Under 37 CFR 1.47)

(86) PCT No.: PCT/CA2010/001215
§ 371 (c)(1),
(2), (4) Date: May 14, 2012

(87) PCT Pub. No.: WO2011/014958
PCT Pub. Date: Feb. 10, 2011

(65) Prior Publication Data
US 2012/0256790 A1 Oct. 11, 2012

Related U.S. Application Data

(60) Provisional application No. 61/231,292, filed on Aug. 4, 2009.

(51) Int. Cl.
*G01S 19/05* (2010.01)
*H04L 12/801* (2013.01)

(52) U.S. Cl.
CPC .............. *G01S 19/05* (2013.01); *H04L 47/12* (2013.01); *H04L 47/14* (2013.01)

(58) Field of Classification Search
CPC .......... G01S 19/05; G01S 19/06; G01S 19/27
USPC ............. 342/357.4, 357.42, 357.66; 701/468, 701/469
See application file for complete search history.

(56) References Cited

U.S. PATENT DOCUMENTS

2003/0011511 A1 * 1/2003 King et al. ............... 342/357.02
2007/0192029 A1   8/2007 Riben et al.

FOREIGN PATENT DOCUMENTS

| JP | 2006162265 | 6/2006 |
| WO | 2005/006593 | 1/2005 |
| WO | 2010/065495 | 6/2010 |

OTHER PUBLICATIONS

International Search Report relating to International Patent Application No. PCT/CA2010/001215, mailed Nov. 15, 2010, 4 pages.
Written Opinion relating to International Patent Application No. PCT/CA2010/001215, mailed Nov. 15, 2010, 4 pages.
Supplementary European Search Report relating to European Patent Application No. EP 10805917.1, mailed Dec. 6, 2012, 5 pages.

* cited by examiner

*Primary Examiner* — Dao Phan
(74) *Attorney, Agent, or Firm* — Seed IP Law Group PLLC

(57) ABSTRACT

A system and method for reducing peak loads on a network, includes: a server in communication with a plurality of GPS receivers, the receivers sending requests for an ephemeris to the server when a time of ephemeris (TOE) for a previous ephemeris expires; and the ephemeris received by the receivers being adjusted by the addition of a value to the TOE of the ephemeris, the value being randomly adjusted to a 16 second interval between 16 seconds and 30 minutes.

12 Claims, 3 Drawing Sheets

SYSTEM AND METHOD FOR MANAGING EPHEMERIS REQUESTS FROM CLIENT DEVICES

FIELD

The present embodiments describe a system and method for extending the usability of ephemeris data in Global Navigation Satellite Systems (GNSS) in order to reduce peak server traffic loads when delivering assistance data to a large number of client devices requiring GNSS assistance for improved Time-To-First-Fix (TTFF) and receiver sensitivity. The method and apparatus is applied to the Global Positioning System (GPS) satellites, but is equally applicable to other Global Navigation Satellite Systems (GNSS) as well as other future or planned satellite systems.

BACKGROUND

Satellite positioning capabilities are being added to a wide variety of consumer, enterprise and safety products such as Personal Navigation Devices (PND), cell phones, asset tracking modules and in-vehicle systems to name a few. While most devices currently use GPS, the United States GNSS, several other GNSS are either operational or planned, including Russia's GLONASS and Europe's Galileo. Over the past decade, assistance techniques have emerged to optimize the performance of GPS and GNSS in mobile devices, specifically in terms of reduced TTFF, reduced power consumption and increased sensitivity. These are generally referred to as Assisted-GPS (AGPS) or more generically, Assisted-GNSS (AGNSS), where a server element is designed to deliver GNSS assistance data to a client device allowing the GNSS receiver in the client to acquire GNSS satellite signals more quickly and thus determine its location more effectively than if un-assisted.

The assistance data served to a requesting client device can contain several GNSS elements depending on the GNSS system in use and on what the client device's onboard GNSS receiver may already have in memory. The largest and most important assistance element is known as the Ephemeris. GNSS receivers require the orbit positions of the GNSS satellites at the time ranging signals are transmitted in order to compute a position solution. Currently, this orbit information is provided by the satellites on a radio frequency (RF) data link in the form of a satellite position model. The model utilizes a set of orbital elements, the Ephemeris, which in the case of GPS, is valid for a limited time period, typically 4 to 6 hours.

The GPS satellites broadcast the Ephemeris data on an RF data link, and the GPS receiver continuously monitors and demodulates this data stream to obtain updated Broadcast Ephemeris. The Ephemeris data is a mathematical orbit arc model that allows the user to evaluate a set of equations, and obtain the satellite position at any time during the model fit period. Although the model allows the evaluation of the satellite position beyond the 4 to 6 hours of validity, the accuracy typically degrades to the level of a kilometer within a day. For a more detailed description of GPS and the ephemeris model, see "Global Positioning System: Theory and Applications" edited by Parkinson and Spilker, Vol. 1, chapters 2 (signal structure), 4 (ephemeris model), and 9 (navigation solutions).

In AGNSS deployments with a large number of client devices, such as in mobile networks where AGPS has been implemented, the traffic load on the assistance server peaks around the expiry times of the Ephemeris data. For GPS, this is typically every two hours when devices simultaneously start to request fresh Ephemeris assistance data as the validity period of the previously received Ephemeris expires. As millions of devices may exist within a given AGNSS system, this cyclical peak traffic condition can result in congestion issues. These issues are currently typically mitigated by designing the server capacity around peak levels, adding excess capacity between cycles and increasing systems costs.

There is prior art in the form of patents, patent applications and articles attesting to the value of providing satellite orbits for longer time periods when the fresh Ephemeris is not readily available directly from the satellites or through an AGNSS server. These are generally known as Extended Ephemeris techniques.

In McMahan et al., ("Position detection system integrated into mobile terminal", U.S. Pat. No. 6,437,735, Aug. 20, 2002), almanac data is created in the memory of the mobile terminal by converting the ephemeris information into almanac information. The stored almanac information is then used for faster satellite signal acquisition and position calculation at a later time. The Ephemeris information may be received from either the satellites or an AGNSS server.

A method in Garin et al. (Garin et al., "Determining position without current broadcast ephemeris", Patent Application No: US 2008/0129593 A1, Jun. 5, 2008), determines the satellite orbits without broadcast Ephemeris data for extended time periods. The mobile device stores the satellite sates extracted from the broadcast Ephemeris and numerically integrates equations of motion with regard to the already stored satellite states to determine current satellite states. The satellite state predictor determines current satellite states using appropriate force models which include Earth gravity model, luni-solar model, solar radiation pressure and yaw-bias parameters.

Finally, Han et al. ("Method and apparatus in standalone positioning without broadcast ephemeris", Patent Application No: US 2008/0111738 A1, May 15, 2008) discloses methods for enabling a standalone navigation device to generate predicted satellite orbits based on historical information stored in the device without the need of connecting to a remote assistance data server. The predicted orbits may be accurate for several days without reception of broadcast Ephemeris.

SUMMARY

The prior art techniques above aim to generate and provide synthetic Ephemeris data to the GNSS receiver in order to address scenarios where actual broadcast Ephemeris cannot be received from the satellites or from an assistance server. By contrast, the present embodiments assume Ephemeris is available either through satellites or an AGNSS server and modifies certain parameters such that any future requests for AGNSS server-provided Ephemeris do not create high peak traffic AGNSS server loads.

In summary, the present embodiments provide an inexpensive method to provide Ephemeris assistance data when the current Ephemeris in a GNSS receiver is no longer valid. The present embodiments can be implemented either within the AGNSS server, within the GNSS receiver or within both. The present embodiments modify the current Broadcast Ephemeris within the AGNSS server or within the GNSS receiver and extends its validity beyond the normal period. As a result, when Broadcast Ephemeris is unavailable directly from satellites, subsequent requests for Ephemeris assistance data from an AGNSS server by GNSS receivers will be randomly spread past the normal expiry time of Broadcast Ephemeris, thereby decreasing the peak traffic load at the AGNSS server.

The present embodiments propose a new Ephemeris assistance data serving method to address the natural cyclical peak traffic conditions faced by servers in large AGNSS. The novel aspect of this method involves modifying the normal validity period of the Ephemeris assistance data served to client devices and allowing this period to randomly "slide" by a certain amount of time past the normal expected expiry of the Ephemeris data. For example, in an AGPS system, this means extending the Time of Ephemeris (ToE) parameter by a certain amount of minutes and adjusting 3 other parameters to reflect this extension so the client device can seamlessly operate with this modified assistance data. The sliding length is a function of the desired and tolerable accuracy degradation a GNSS receiver can experience. For most mobile systems using AGPS, the sliding length could be up to 30 minutes without noticeable accuracy degradation by the GNSS receiver. As a result, AGNSS systems using this method will effectively spread and smooth traffic loads around the normal cyclical peaks as the timing of assistance requests from client devices is randomized based on the previously received sliding ephemeris.

In one aspect there is provided, a method of reducing peak loads on a server transmitting ephemeris to a plurality of GPS receivers, including: a) said server receiving a request for an ephemeris from one of said clients, said ephemeris having a time of ephemeris parameter; b) adjusting said time of ephemeris (TOE) parameter by adding a value to said time of ephemeris; and c) providing said adjusted ephemeris to a GPS receiver.

In another aspect there is provided, a system for reducing peak loads on a network, including: a server in communication with a plurality of GPS receivers, said receivers sending requests for an ephemeris to said server when a time of ephemeris (TOE) for a previous ephemeris expires; and said ephemeris received by said receivers being adjusted by the addition of a value to said TOE of said ephemeris, said value being randomly adjusted to a 16 second interval between 16 seconds and 30 minutes.

DRAWINGS

The following figures set forth embodiments in which like reference numerals denote like parts. Embodiments are illustrated by way of example and not by way of limitation in the accompanying figures.

DETAILED DESCRIPTION

Figure 1:
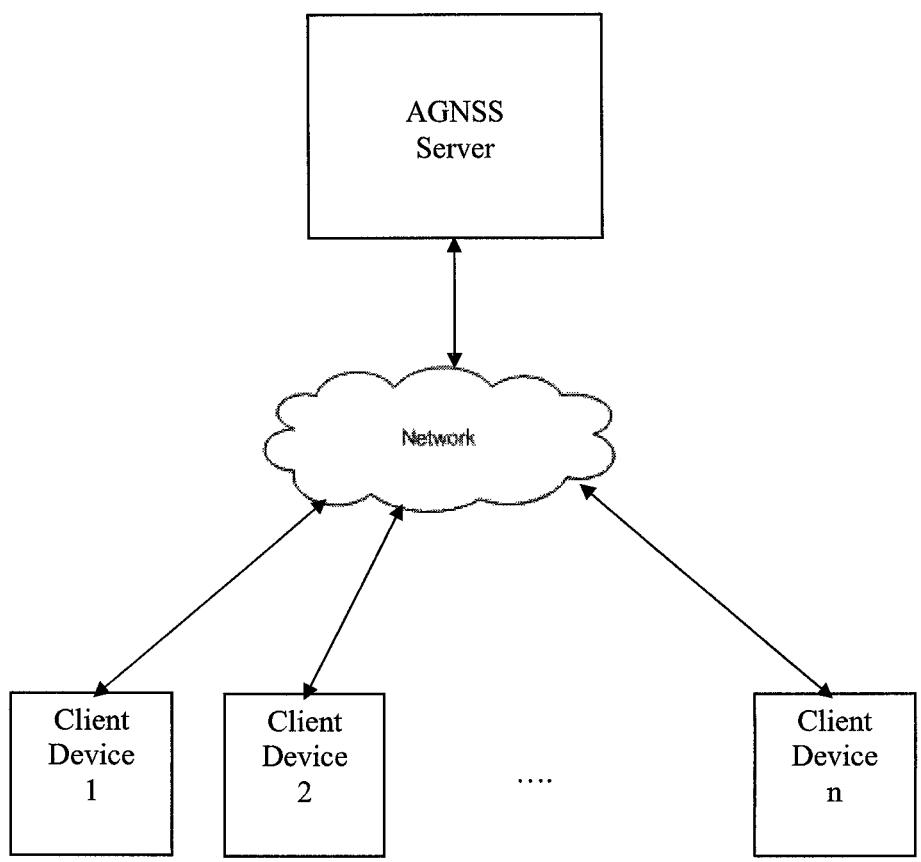
FIG. 1 is a block diagram illustrating communication between multiple client devices and a server over a network.

In some GNSS applications, low satellite signal strength makes it difficult for a GNSS receiver to detect and process satellite signals. This is particularly challenging in mobile devices equipped with GNSS receivers, such as cell phones, Personal Navigation Devices and asset tracking modules, particularly when operating in urban and indoor environments. AGNSS is a well-known technique in the industry that helps GNSS receivers achieve shorter TTFF and greater sensitivity by supplying assistance data containing information that would otherwise have to be directly received and decoded from the satellite signals.

The most prevalent use of AGNSS today is within mobile networks wherein the GNSS receiver integrated in a mobile phone is designed to receive assistance data from an AGNSS server over a communication link, typically the wireless network itself. An example of this is the current Open Mobile Alliance (OMA) and 3GPP standard called SUPL (Secure User PLane). Virtually all network equipment vendors and mobile phone vendors now provide SUPL-compliant solutions for mobile network operators to optimize the performance of their GNSS-enabled handsets. AGNSS servers are typically designed to meet expected traffic loads for assistance requests. Given the anticipated growth of GNSS-enabled handsets and the pervasiveness of location-enabled applications, techniques that can optimally scale and match server capacity can ensure high quality subscriber services while mitigating both operating and capital costs for service providers.

In current AGNSS deployments, such as SUPL, once the Ephemeris' expiration time has been reached, typically two hours after its Time Of Ephemeris parameter (TOE) for GPS, the handset will request new Ephemerides from the AGNSS server. Since potentially all handsets could contain the same Ephemeris, having the same TOE and expiry time, this can result in a deluge of simultaneous assistance requests at the AGNSS Server. Service providers and network operators are faced with a traffic planning challenge as they must provide enough capacity in their AGNSS servers to meet these peak periods of demand despite the obvious lulls in between the two hour peak periods. Service providers and network operators would therefore benefit if these peak loads could be reduced and spread over time, while preserving the same quality of assistance data.

The present embodiments provide a method and system to artificially extend a Broadcast Ephemeris' validity beyond its normal period. For GPS, this extends the validity beyond the normal two hours past the TOE. Using Ephemeris beyond its prescribed duration does have some effect on accuracy, however, for most applications the effect of this extension on the GNSS Receiver's line of sight accuracy of the Broadcast Ephemeris is essentially negligible for short periods, for example, for up to 30 minutes beyond the normal validity period, i.e. up to two hours and 30 minutes past the TOE in the case of GPS (c.f. Table 2). In addition to TOE, three other model parameters are adjusted (described further below). As a result, the orbit arc model represented with these four adjusted parameters remains similar to the original Broadcast Ephemeris model (up to over-the-air quantization).

As the modified Ephemeris, built by adjusting the TOE and related parameters, yields similar accuracy performance, it enables the ability to smooth out traffic load at AGNSS servers. The system and method provided by the present embodiments allow for randomizing the timing of future assistance requests to AGNSS Servers by randomly extending the validity period of the Ephemeris by up to 30 minutes in the case of GPS TOE and related parameters. This sliding of the TOE can either take place within the AGNSS server or within the GNSS receiver such that subsequent requests for assistance data takes place at staggered times, thereby spreading network traffic and AGNSS Server loads. When using an extension window of 30 minutes in a GPS system, this decreases peak Ephemeris assistance data request loads by up to 112 times as TOEs must fall on 16 seconds boundaries (in GPS time).

Referring to FIG. 1, the method and apparatus of the present embodiments may be applicable to any AGNSS service which provides standard assistance to a large group of GNSS-enabled devices. The SUPL standard published by the Open Mobile Alliances provides protocol specifications for requesting and delivering assistance data from an assistance data source (e.g. an AGNSS Server) and an assistance data client (i.e. a GNSS-enabled mobile phone). The SUPL standard is a representative embodiment wherein either or both of the SUPL Server and SUPL Client could seamlessly use Ephemeris that has been extended by a random amount of time beyond its normal validity period without modification to the standard server, client or protocol. Since SUPL is the primary AGNSS standard, peak traffic volume at TOE boundaries is a major issue for the design, scalability and performance of SUPL Servers. This and other embodiments can decrease peak ephemeris assistance data request loads by up to 112 times, as TOEs fall on 16 second boundaries (in GPS time), if ephemeris is used up to 30 minutes beyond its normal validity period. The extension window period of 30 minutes provided herein is arbitrary, as service providers and network operators can decide on the appropriate tradeoff between accuracy and load balancing for longer or shorter windows of time, as highlighted in Table 2.

This system and method disclosed herein may be implemented using a general architecture that can be designed using alternative methods at certain points while preserving its fundamental design function and purpose of the original system.

A system and method for extending the usability of ephemeris data in Global Navigation Satellite Systems (GNSS) in order to reduce and optimize server traffic loads when delivering assistance data to a multiplicity of client devices requiring GNSS assistance for improved Time-To-First-Fix (TTFF) and receiver sensitivity are disclosed herein. The system and method are described as being applied to the Global Positioning System (GPS) satellites, but are equally applicable to other Global Navigation Satellite Systems (GNSS) as well as other future or planned satellite systems.

An embodiment is provided below for SUPL-based implementation of AGPS systems in which:

1. Ephemeris assistance data is provided by the SUPL Server to a SUPL Client over a communications link, typically every four hours.

2. Software running at the SUPL Server modifies the Time Of Ephemeris (TOE) and three other parameters of the normal Broadcast Ephemeris and extends them forward in time by a random increment of up to half an hour, in order to extend the period of validity of the Ephemeris to be delivered to the SUPL Client.

3. Based on the extended TOE, the following orbital elements are rebased and correspondingly propagated in time based on dt:

$(OMEGA)_0$, $M_0$ and $i_0$ are rebased in time based on the following models:

$$toe = toe + dt$$

$$(OMEGA)_0 = (OMEGA)_0 + OMEGADOT \times dt$$

$$M_0 = M_0 + dt \times \sqrt{\left(\frac{GME}{A^{\frac{3}{2}}}\right) + \Delta n}$$

$$GME = 3.986005 \times 10^{14} \left(\frac{m^2}{s^2}\right)$$

$$i_0 = i_0 + IDOT \times dt$$

is meters cubed and $s^2$ is seconds squared $i_0 = i_0 + IDOT \times dt$.

4. Other orbital parameters keep their original values. For any given time t>TOE, an accurate estimate of the satellite's position can be obtained using the orbital elements centered at point TOE.

5. Subsequent requests for assistance data by SUPL Client will be randomly spread over the extension window of TOE, thereby reducing peak traffic loads at the SUPL Server.

Figure 2:
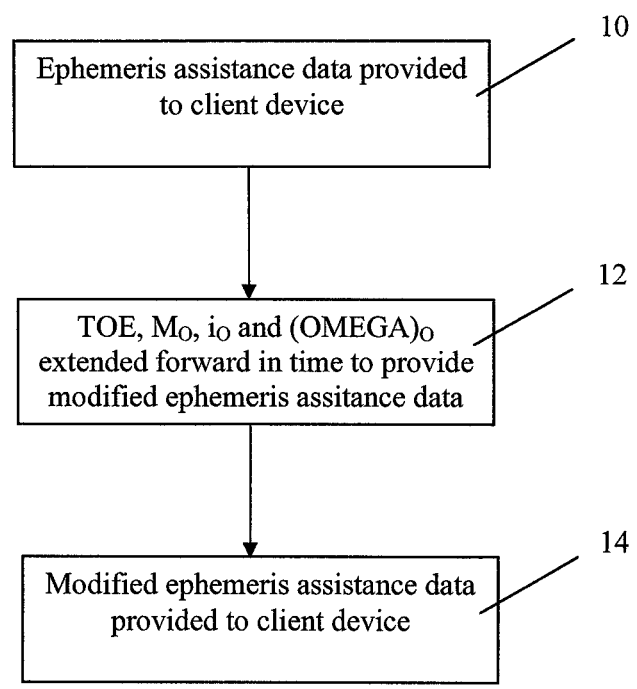
FIG. 2 is a flowchart depicting a method for reducing peak loads on a server by modifying the ephemeris data according to an embodiment.

Referring to FIG. 2, a method according to an embodiment includes: at step 10, providing ephemeris assistance data to a client device; at step 12, extending parameters: TOE, $M_0$, $i_0$ and $(OMEGA)_0$ forward in time to provide modified assistance data; and at step 14, providing the modified assistance data to the client device.

Figure 3:
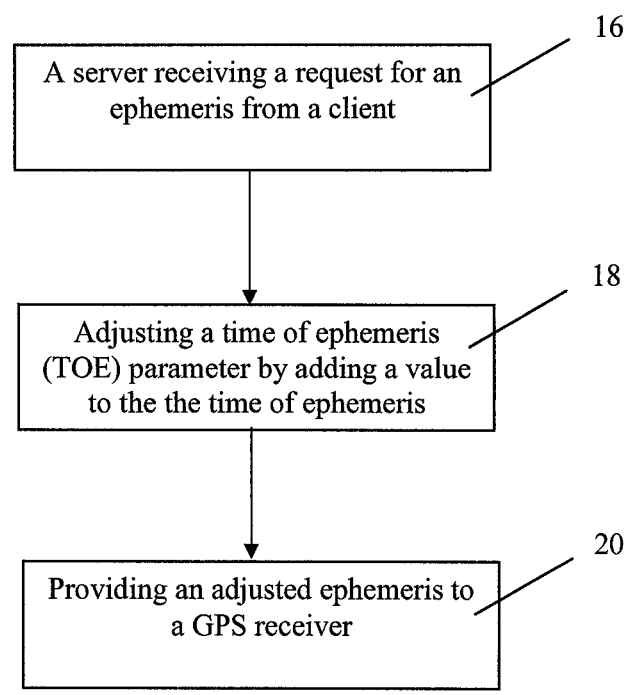
FIG. 3 is a flowchart depicting a method for reducing peak loads on a server by modifying the ephemeris data according to another embodiment.

Referring to FIG. 3, a method according to another embodiment includes: at step 16, a server receiving a request for an ephemeris from a client; at step 18, adjusting a time of ephemeris (TOE) parameter by adding a value to the time of ephemeris; and at step 20, providing an adjusted ephemeris to a GPS receiver of the client.

An additional feature is that the software performing the extension of the Broadcast Ephemeris TOE and related parameters can run at the SUPL Client device.

Alternatively, the Software performing the extension of the Broadcast Ephemeris TOE and related parameters can run at both the SUPL Server and SUPL Client device.

In yet another alternative embodiment, the software performing the extension of the Broadcast Ephemeris TOE and related parameters can run separately from the SUPL Server or Client software.

In yet another alternative embodiment, the software performing the extension of the Broadcast Ephemeris period of validity can operate on one or multiple GNSS depending on the deployed system's capabilities.

An additional feature is that the software performing the extension of the Broadcast Ephemeris TOE and related parameters can dynamically adjust the extension window length and interval parameters depending on predicted traffic loads.

An additional feature is that the software performing the extension of the Broadcast Ephemeris TOE and related parameters can dynamically adjust the extension window length and interval parameters depending on the application accuracy requirements.

An additional feature is that the software performing the extension of the Broadcast Ephemeris TOE and related parameters also performs similar random extensions of any long-term Extended Ephemeris if available for use in the deployed system.

The standard orbital elements of the Broadcast Ephemeris are listed in Table 1:

TABLE 1

| Orbital Element | Description |
| --- | --- |
| $M_0$ | Mean Anomaly at Reference Time |
| $\Delta n$ | Mean Motion Difference From Computed Value |
| e | Eccentricity |
| $(A)^{1/2}$ | Square Root of the Semi-Major Axis |
| $(OMEGA)_0$ | Longitude of Ascending Node of Orbit Plane at Weekly Epoch |
| $i_o$ | Inclination Angle at Reference Time |
| ω | Argument of Perigee |
| OMEGADOT | Rate of Right Ascension |
| IDOT | Rate of Inclination Angle |
| $C_{uc}$ | Amplitude of the Cosine Harmonic Correction Term to the Argument of Latitude |
| $C_{us}$ | Amplitude of the Sine Harmonic Correction Term to the Argument of Latitude |

TABLE 1-continued

| Orbital Element | Description |
| --- | --- |
| $C_{rc}$ | Amplitude of the Cosine Harmonic Correction Term to the Orbit Radius |
| $C_{rs}$ | Amplitude of the Sine Harmonic Correction Term to the Orbit Radius |
| $C_{ic}$ | Amplitude of the Cosine Harmonic Correction Term to the Angle of Inclination |
| $C_{is}$ | Amplitude of the Sine Harmonic Correction Term to the Angle of Inclination |

The User Range Error and Velocity Error relative to the TOE extension window is shown in Table 2:

TABLE 2

| TOE Extension Time (hour:minutes) | URE 95% Meters | Velocity Error 95% (cm/sec) |
| --- | --- | --- |
| 0:30 | ~5 | 0.5 |
| 0:45 | ~6 | 0.5 |
| 1:00 | ~10 | 0.7 |
| 1:30 | ~20 | 1 |
| 2:00 | ~35 | 1 |

We claim:

1. A method of reducing peak loads on a server transmitting ephemeris to a plurality of GPS receivers, comprising:
   a) said server receiving a request for an ephemeris from a clients, said ephemeris having a time of ephemeris parameter;
   b) adjusting said time of ephemeris (TOE) parameter by adding a value to said time of ephemeris; and
   c) providing said adjusted ephemeris to a GPS receiver of said client.

2. The method of claim 1 wherein a Mean Anomaly at Reference Time ($M_0$) parameter of said ephemeris is adjusted relative to said value.

3. The method of claim 2 wherein an Inclination Angle at Reference Time ($i_0$) parameter of said ephemeris is adjusted relative to said value.

4. The method of claim 3 wherein a Longitude of Ascending Node of Orbit Plane at Weekly Epoch ($(OMEGA)_0$) parameter of said ephemeris is adjusted relative to said value.

5. The method of claim 4 wherein said TOE parameter, said $M_0$ parameter, said $i_0$ parameter and said $(OMEGA)_0$ parameter are adjusted at said server.

6. The method of claim 4 wherein said TOE parameter, said $M_0$ parameter, said $i_0$ parameter and said $(OMEGA)_0$ parameter are adjusted at said GPS receiver.

7. The method of claim 4 wherein said value is a 16 second multiple between 16 seconds and 30 minutes.

8. The method of claim 6 wherein said $(OMEGA)_0$ parameter is adjusted according to the formula:

$$(OMEGA)_0 = (OMEGA)_0 + OMEGADOT \times dt$$

wherein dt equals said value and OMEGADOT represents a Rate of Right Ascension parameter of said ephemeris.

9. The method of claim 8 wherein said $M_0$ parameter of said ephemeris is adjusted according to the formula:

$$M_0 = M_0 + dt \times \sqrt{\left(\frac{GME}{A^{\frac{3}{2}}}\right) + \Delta n}$$

$$GME = 3.986005 \times 10^{14} \left(\frac{m^2}{s^2}\right)$$

wherein A represents a semi-major axis parameter of said ephemeris, $\Delta n$ represents a mean motion difference of computed value parameter of said ephemeris, $m^3$ is meters cubed and $s^2$ is seconds squared.

10. The method of claim 9 wherein said $i_0$ parameter of said ephemeris is adjusted according to the formula:

$$i_0 = i_0 + IDOT \times dt$$

wherein IDOT represents a rate of inclination angle parameter of said ephemeris.

11. The method of claim 10 wherein said server receives a multiplicity of requests for ephemeris from said clients, and the determination of said value is randomized for each of said adjusted ephemeris provided to said receiver.

12. A system for reducing peak loads on a network, comprising:
   a server of the network in communication with a plurality of GPS receivers, said GPS receivers sending requests for an ephemeris to said server when a time of ephemeris (TOE) for a previous ephemeris expires;
   said ephemeris received by said receivers being adjusted by the addition of a value to said TOE of said ephemeris, said value being randomly adjusted to a 16 second interval between 16 seconds and 30 minutes.

* * * * *

UNITED STATES PATENT AND TRADEMARK OFFICE
CERTIFICATE OF CORRECTION

| | |
|---|---|
| PATENT NO. | : 9,134,425 B2 |
| APPLICATION NO. | : 13/387647 |
| DATED | : September 15, 2015 |
| INVENTOR(S) | : Eric Derbez et al. |

It is certified that error appears in the above-identified patent and that said Letters Patent is hereby corrected as shown below:

Specification

Column 5, lines 60-68:

"$GME = 3.986005 \times 10^{14} \left(\frac{m^2}{s^2}\right) i_0 = i_0 + \text{IDOT} \times dt$ is meters cubed and $s^2$ is seconds squared $i_0 = i_0 + \text{IDOT} \times dt$" should read --$GME = 3.986005 \times 10^{14} \left(\frac{m^3}{s^2}\right)$, where $m^3$ is meters cubed and $s^2$ is seconds squared $i_0 = i_0 + \text{IDOT} \times dt$--.

Signed and Sealed this
Fifteenth Day of March, 2016

Michelle K. Lee
*Director of the United States Patent and Trademark Office*

UNITED STATES PATENT AND TRADEMARK OFFICE
CERTIFICATE OF CORRECTION

PATENT NO. : 9,134,425 B2  
APPLICATION NO. : 13/387647  
DATED : September 15, 2015  
INVENTOR(S) : Eric Derbez et al.

It is certified that error appears in the above-identified patent and that said Letters Patent is hereby corrected as shown below:

Claims

Column 8, lines 8-9, claim 8  
"$(OMEGA)_0=(OMEGA)_{0+OMEGA}DOT \times dt$" should read --$(OMEGA)_0=(OMEGA)_0+OMEGADOT \times dt$--.

Column 8, line 20, claim 9  
"$GME = 3.986005 \times 10^{14} \left(\frac{m^2}{s^2}\right)$," should read -- $GME = 3.986005 \times 10^{14} \left(\frac{m^3}{s^2}\right)$ --.

Signed and Sealed this  
Twenty-eighth Day of June, 2016

Michelle K. Lee  
*Director of the United States Patent and Trademark Office*